Figure 11:
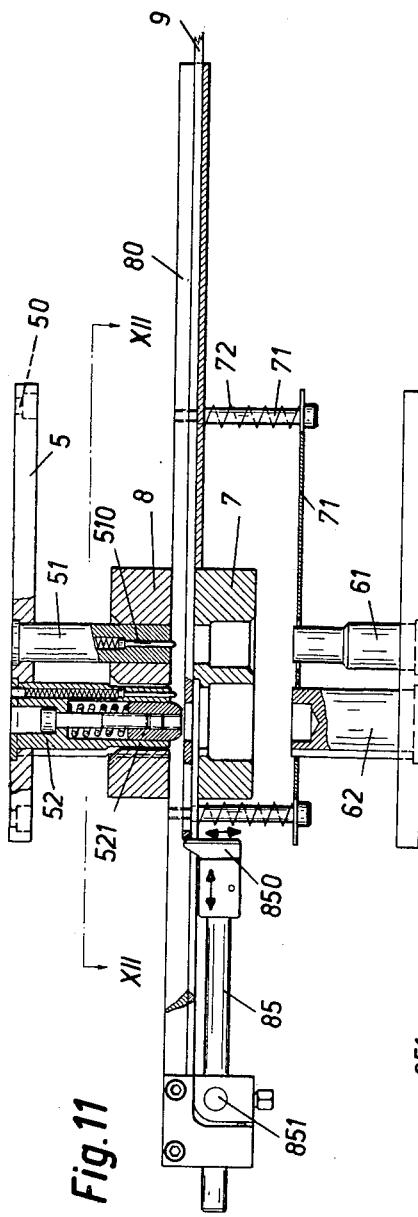

Nov. 9, 1965   O. W. STOECKLI   3,216,299
DEVICE FOR PRODUCING ACCURATE PUNCHED SHEET METAL PARTS
Filed Jan. 20, 1964   10 Sheets-Sheet 1
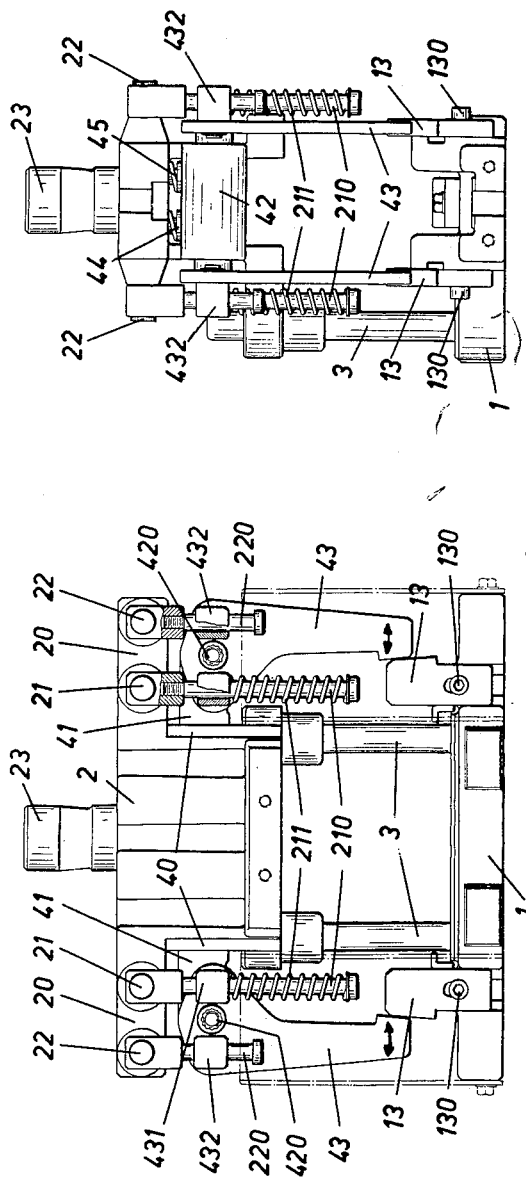
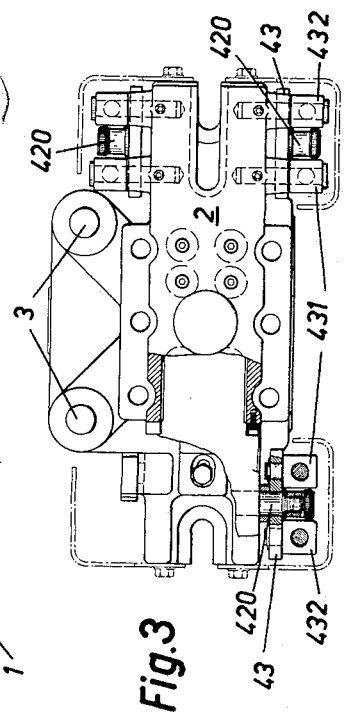
INVENTOR
Oscar W. Stoeckli
BY Werner W. Kleeman
His Attorney

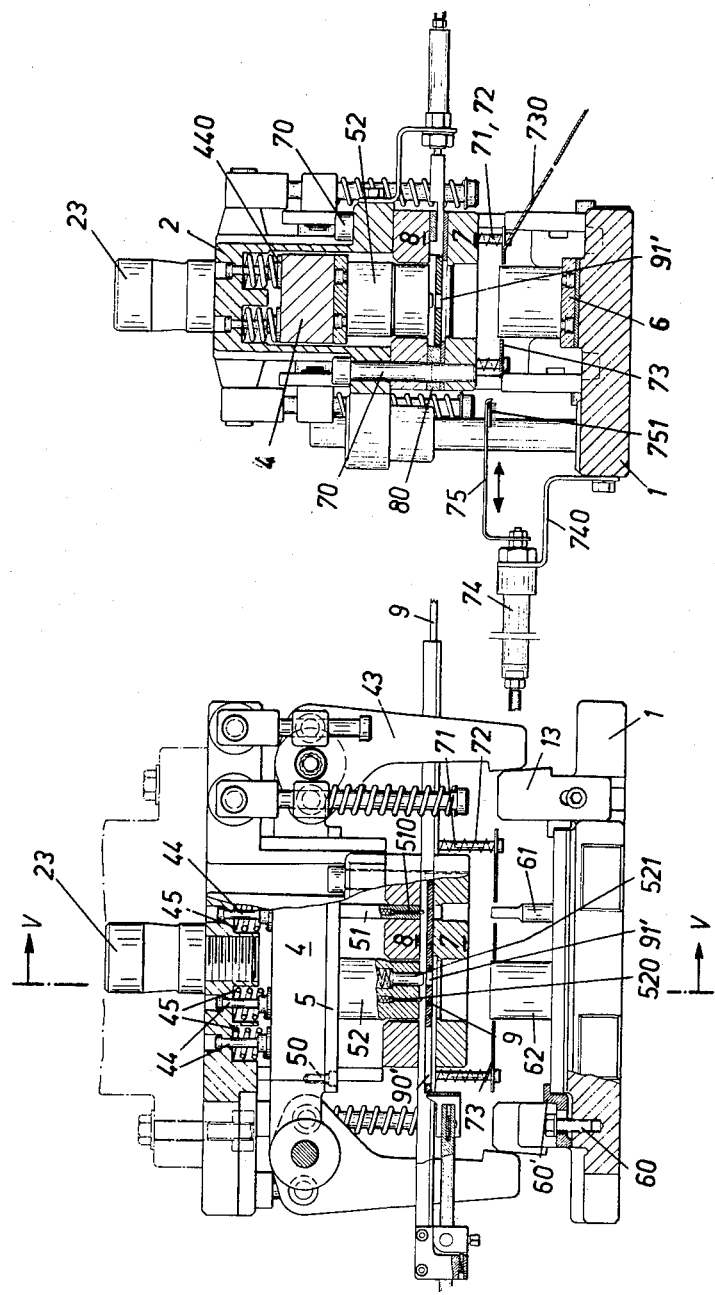

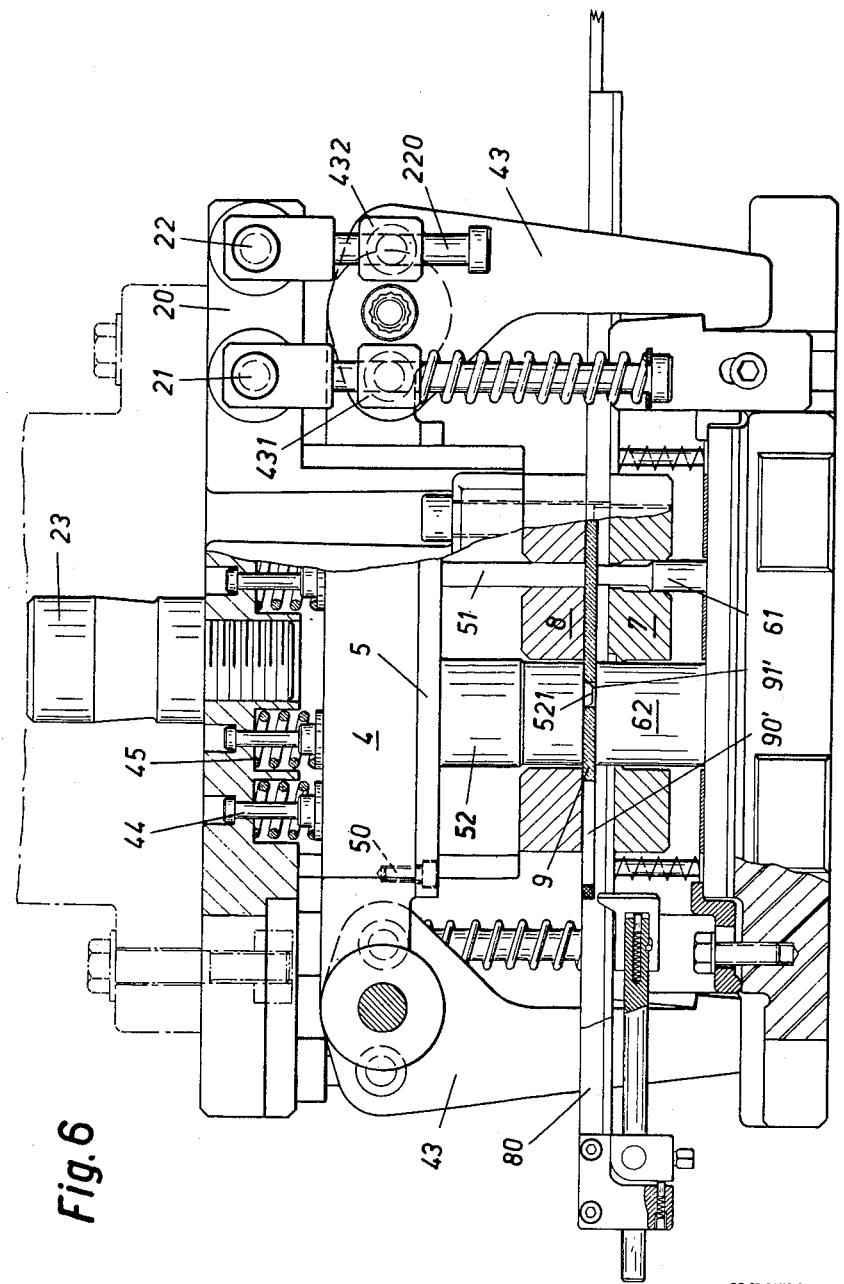

Nov. 9, 1965     O. W. STOECKLI     3,216,299
DEVICE FOR PRODUCING ACCURATE PUNCHED SHEET METAL PARTS
Filed Jan. 20, 1964                    10 Sheets-Sheet 4
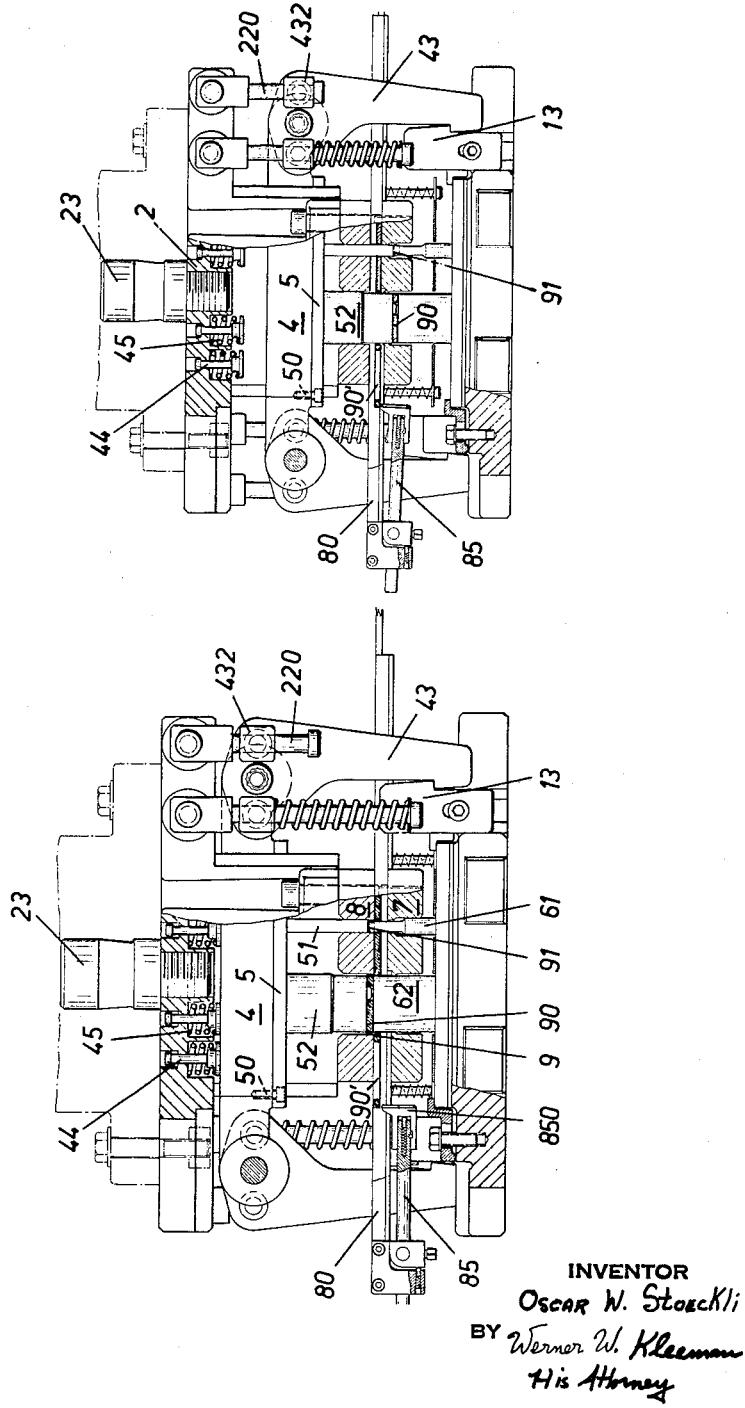
INVENTOR
Oscar W. Stoeckli
BY Werner W. Kleeman
His Attorney

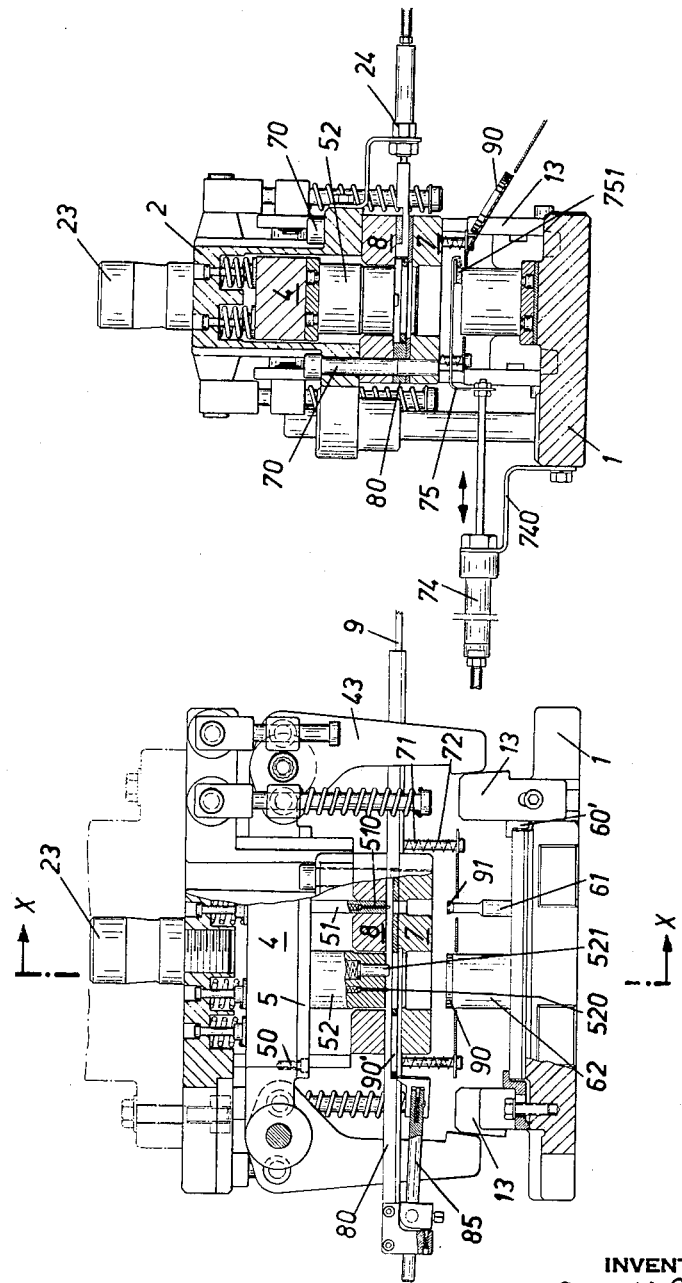

Nov. 9, 1965    O. W. STOECKLI    3,216,299
DEVICE FOR PRODUCING ACCURATE PUNCHED SHEET METAL PARTS
Filed Jan. 20, 1964    10 Sheets-Sheet 6

INVENTOR
Oscar W. Stoeckli
BY Werner W. Kleeman
His Attorney

Nov. 9, 1965    O. W. STOECKLI    3,216,299
DEVICE FOR PRODUCING ACCURATE PUNCHED SHEET METAL PARTS
Filed Jan. 20, 1964    10 Sheets-Sheet 7

INVENTOR
OSCAR W. STOECKLI
BY Werner W. Kleeman
His Attorney

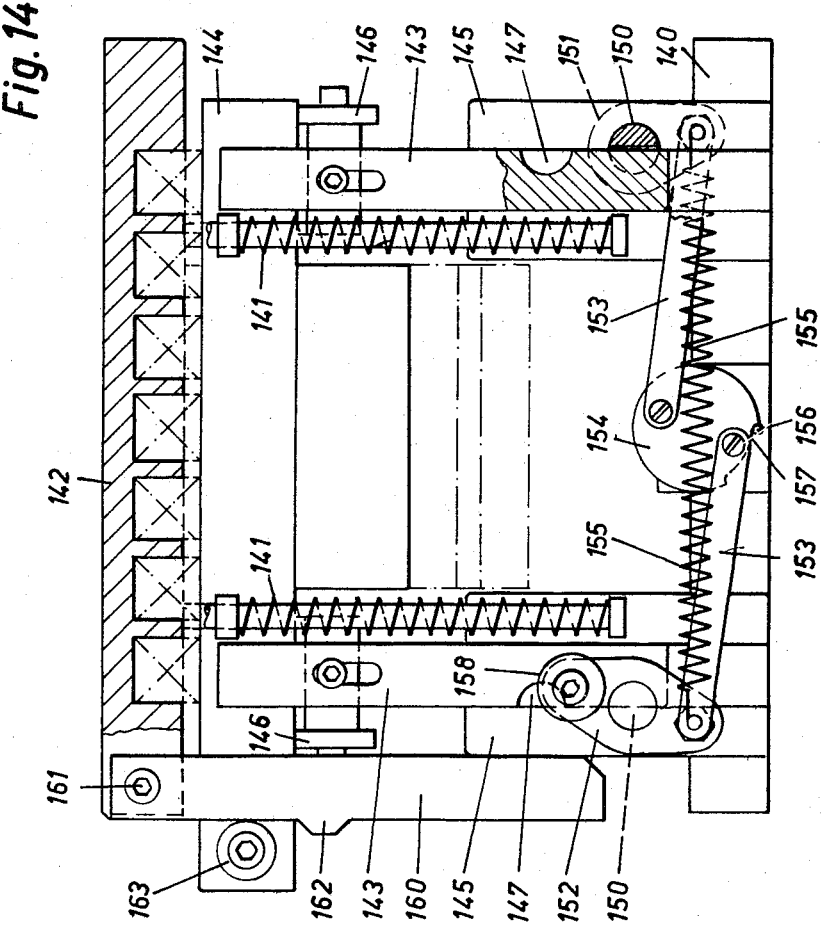

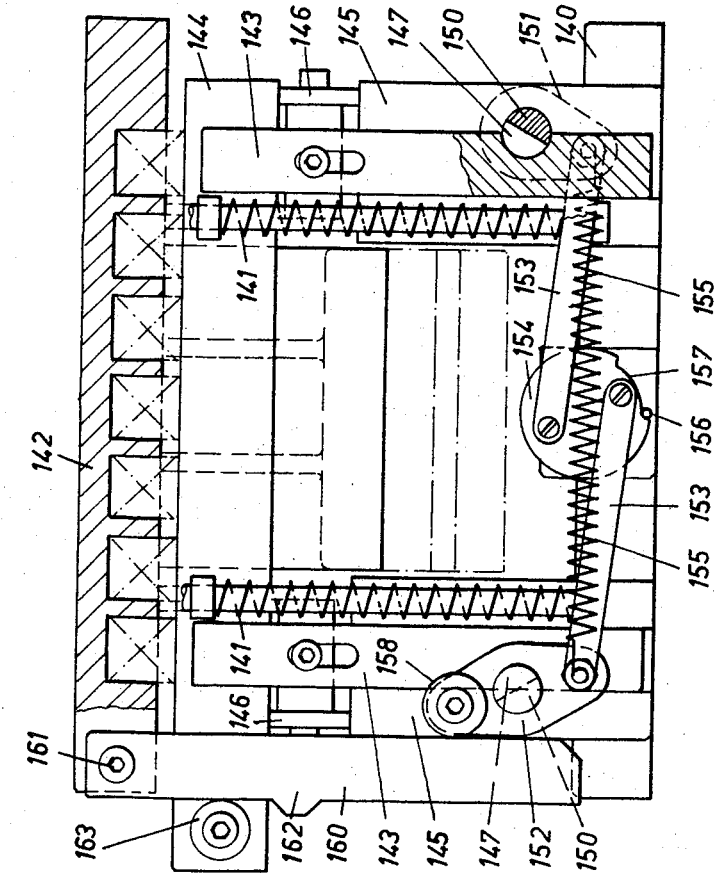

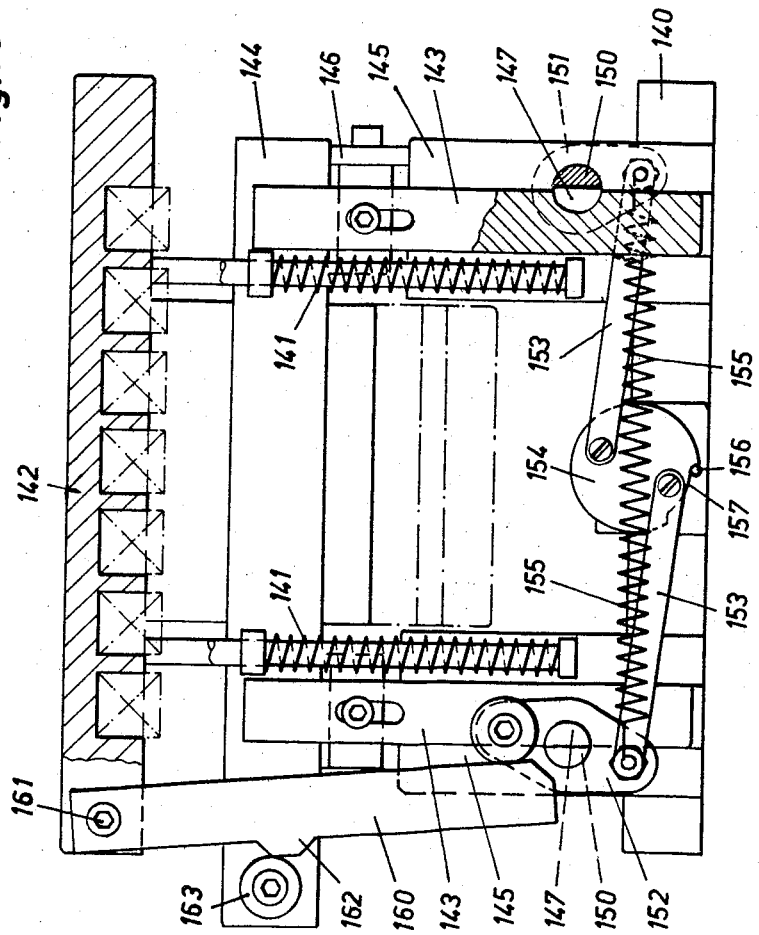

United States Patent Office 3,216,299
Patented Nov. 9, 1965

3,216,299
DEVICE FOR PRODUCING ACCURATE PUNCHED SHEET METAL PARTS
Oscar Walter Stoeckli, 130 Theodore Fremd Ave., Rye, N.Y.
Filed Jan. 20, 1964, Ser. No. 338,672
Claims priority, application Germany, Jan. 29, 1963, St. 20,234
9 Claims. (Cl. 83—160)

The present invention relates to a device for producing accurate punched sheet metal parts. A device for producing punched sheet metal parts is known, wherein on both sides of a passage slot for the raw sheet metal exchangeable die plates and punches, movable transversely of said slot, are provided, which are so constructed that firstly one punch of one side in co-operation with a punching die of the other side performs a preliminary punching operation, and subsequently a shaving punch on the other side in co-operation with a shaving die of the first side performs the shaving operation, the punched part being held fast during the whole sequence of these operations.

My present invention has the primary object of improving the prior device referred to hereinabove. With this and other objects in view, which will become apparent later from this specification and the accompanying drawings, I provide a device for producing accurate punched sheet metal parts comprising in combination: a base plate, punches fixed to said base plate, guide pillars rigidly connected with said base plate, a head plate, a punch carrier plate resiliently movable relative to said head plate, both said head plate and punch carrier plate being guided on said pillars, punches fixed on said punch carrier plate opposite said punches fixed on said base plate, exchangeable die plates having dies including between one another a passage slot for the sheet metal to be punched, a punch on one side of said gap in co-operation with a die on the other side performing a preliminary punching operation, and subsequently a punch on the other side in co-operation with a die on the first mentioned side performing a shaving operation, locking means arranged on said base plate and punch carrier plate rigidly interlocking said base plate and punch carrier plate after the initiation of the preliminary punching operation into an integral unit in a position, in which said punches on said base plate and on said punch carrier plate hold said sheet metal immovably fast during all said punching operations until the shaving operation is terminated.

These and other features of my said invention will be clearly understood from the following description of two embodiments thereof given by way of example with reference to the accompanying drawings, in which:

FIG. 1 is a side elevation of the punching device, but without any inserted tools, FIG. 2 is a front elevation of the device according to FIG. 1, FIG. 3 is a plan view of the device according to FIG. 1, FIG. 4 is an elevation partly in section corresponding to FIG. 1, but on a larger scale and with the tools inserted, immediately after the feed of the sheet metal strip to be punched and prior to the punching operation, FIG. 5 is a section on line V—V of FIG. 4, FIG. 6 shows the device according to FIG. 4 on yet a larger scale, shortly after the beginning of the punching operation, FIG. 7 shows the device according to FIG. 4, on the scale of FIG. 1, immediately after the performing of the preliminary punching operation, FIG. 8 shows on a smaller scale the device according to FIG. 4, immediately after the shaving operation, FIG. 9 shows on the scale of FIG. 7, the device according to FIG. 4 immediately after the termination of the punching operation and before the advancing of the sheet metal strip.

Figure 12:
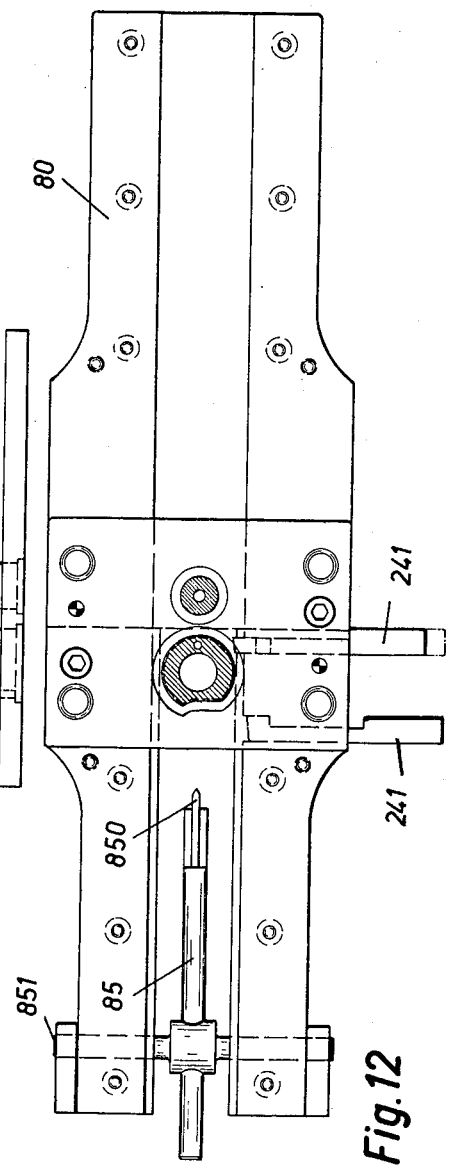
Figure 13:
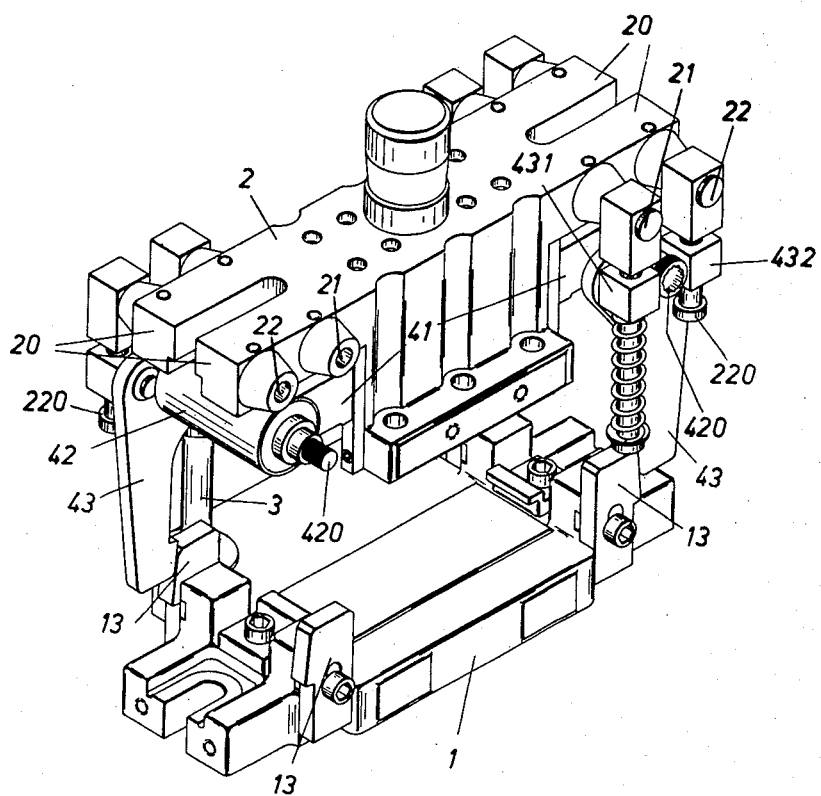

FIG. 10 is a section on the line X—X of FIG. 9 during the ejection of the finished punched component, FIG. 11 is a longitudinal section through the assembly of the exchangeable tools, FIG. 12 is a section on the line XII—XII of FIG. 11, FIG. 13 is a perspective view of a partly assembled punching device, FIG. 14 is an elevation of a second embodiment having locking members modified as compared with those of FIG. 1, FIG. 15 corresponds to FIG. 14, but with its members in the same working phase as in FIG. 6, FIG. 16 corresponds to FIGS. 14 and 15, but with its members at the moment of unlocking.

With reference to FIGS. 1 to 3 and 13, the punching device comprises a guide structure, comprising a base plate 1 and two pressed-in guide columns 3 for the head plate 2, which is movable up-and-down. Under the head plate, a punch carrier plate 4 is mounted movably relative to the head plate in the vertical direction (see FIGS. 4, 5). This carrier plate 4 carries guide rails and yoke ends 41 attached to its end faces and co-operating with juxtaposed guide faces of the head plate 2 as vertical guides, bearing bushes 42 for shafts 420 being inserted in said yoke ends. On these shafts pawl levers 43 are pivotally journalled in pairs. In endwise projecting extensions 20 of the head plate 2 bearings 21, 22 are arranged in pairs for pairs of pivot pins 210, 220, each of which is additionally guided in guides 431 and 432, respectively, attached to the pawl levers 43.

Compression springs 211 on the longer inner pins 210 tend to turn the pawl levers 43 in such a manner that their lower ends are turned in the direction of the arrows (see FIG. 1). When however, as will be explained later, the lower heads of the shorter pins 220 are pulled upward relative to the guides 432 and abut the same, they effect a turning of the pawl levers 43 against the pre-loading of the springs 211 on the longer pins 210.

Above the plate 4, the head plate 2 contains spring washers 440 (see FIGS. 4 ff.) on bolts 44, which are guided in bores of the head plate 2, and compression springs 45 tend to force the punch carrier plate 4 away from the underside of the head plate. On the base plate 1, pawl holder plates 13 are screwed fast, adjustably in height by means of screws 130.

From FIGS. 4 ff. it can be seen, how by means of screws 50 on the underside of the punch carrier plate 4 a shaving punch tool 5 may be attached, which comprises the shaving punches 51 and 52.

It will be likewise seen in these FIGS. 4 ff. how by means of screws 60 and clamping brackets 60' a punching tool 6 can be clamped fast, which comprises the punching stamps 61 and 62.

On the underside of lateral projections of the head plate 2 a die plate aggregate, comprising a shaving die plate 7 and a punching die plate 8 as well as a spacer rail arrangement 80 may be exchangeably attached by means of screws 70. By means of screws 71 on which compression springs 72 are mounted a sheet metal strip 73 is suspended under the shaving die 7, which strip has an ejector ramp 730 sloping down sideways. A compressed air cylinder 74, which is attached to the base plate 1 by means of a bracket 740, has an ejector 75 fitted to its piston rod, which is moved in the direction of the arrow (FIGS. 5 and 10) when actuated.

According to FIGS. 11 and 12, on the rail guide 80, which is clamped in between the die plates 7 and 8, an abutment and/or rest device is mounted for determining the correct advance for the sheet metal strips 9. This device comprises an abutment member 850 at the end of a bolt 85, which is mounted at 851 in the guide rails 80, a slight preloading being maintained by means of spring members in the bearing 851 in the sense of the arrow indicated in FIG. 11. Moreover the abutment member 850 is resiliently supported on the bolt 85 in such a manner that it can be pushed back a short distance in the axial direction on the bolt 85 towards its bearing axle 851 by loading the corresponding spring member.

The manner of operation of the device illustrated and described hereinabove as regards its assembly is as follows:

From sheet metal strips 9 pierced discs 90 are to be produced as accurately punched parts in successive cuts. The spacing rail arrangement 80 inserted between the die plates 7 and 8 forms at the same time a guide for advancing the sheet metal strip 9 to the abutment member 850, which engages into a previously punched hole 90' of the sheet metal strip 9 and is slightly pushed back, its resilient support being loaded thereby. In FIG. 4 this position is shown, all members being shown in their rest position in FIG. 6. The sheet metal strip 9 has between the pair of punches 52–62 already a hole 91', which had been formed in the preceding punching operation by the pair of punches 51–61 and which constitutes the hole in the punched part to be produced. Above this hole a sensing pin 521 is resiliently inserted in the shaving punch 52, and by its side an ejector pin 520 is likewise resiliently inserted in the shaving punch 52; correspondingly such an ejector pin 510 is resiliently inserted in the hole shaving punch 51. When the head plate 2 is depressed by means of the press ram of a punching press connected with the clamping spigot 23, the punch carrier plate 4 takes part in this movement, firstly in an unchanged position relative to the head plate 2, and with the latter moves the aggregate of die plates 7, 8, 80 into the position shown in FIG. 6. The pairs of punches 51, 61 and 52, 62 engage between one another the sheet metal strip 9 from top and from below, and the noses of the pawl levers 43 have reached under the opposite noses of the pawl holder plates 13. From this moment onwards the sheet metal strip 9 is held fast between the aforesaid pairs of punches until the inter-locking of the levers 43 and holder plates 13 is disengaged. The sensing pin 521 on the shaving punch 52 engages into the previously punched hole 91' of the sheet metal strip 9. By continuing the punching movement of the head plate 2, the members are brought into the position illustrated in FIG. 7. It will be seen that by depressing the aggregate of dies 7, 8 relative to the punch carrier plate 4 the punching stamp 61 in cooperation with the associated hole in the die 8 punches the center disc 91 out of the sheet metal strip 9, and at the same time the punching stamp 62 in co-operation with the associated hole of the punching die 8 punches the desired punched part 90 out of the sheet metal strips. Since the aggregate of dies with the rail 80 and abutment device 85 has been moved downwardly relative to the sheet metal strip 9, the abutment member 850 comes out of engagement with the sheet metal strip, and as will be seen from FIGS. 7–9, jumps, by the action of its resilient support, under the sheet metal strip. The shaving punch tool 5 with the shaving punches 51, 52 had to give way upwardly, whereby the punch carrier plate 4 was forced towards the head plate 2 and the springs 45 were additionally loaded.

When subsequently the head plate 2 is withdrawn upwardly, the punch carrier plate 4 remains in the position shown in FIGS. 6, 7, 8 owing to its interlocking with the base plate by means of the pawl levers 43 while the head plate 2 moves back into the position shown in FIGS. 4, 5, 9 and 10. Thereby the shaving stamps 51, 52, in co-operation with the juxtaposed holes in the shaving dies 7, shave the previously punched holes 91' to the desired accuracy in dimensions and shape at the same time the shaving punch 52 in co-operation with the shaving die 7 shaves the contours of the punched part 90 to the desired accuracy in dimensions and shape. In FIG. 8 the termination of the shaving operation is illustrated. In this position of the members, the lower heads of the bolts 220 abut the guide bushes 432, which are fixedly mounted on the pawl levers 43, so that by a small continuation of the upward movement of the head plate 2 the pawl levers 43 are swung out of engagement with the plates 13, and the interlocking of the punch carrier plate 4 with the base plate 1 is abolished.

By the action of the springs 211 on the bolts 210 the punch carrier plate 4 is moved back into the position of FIG. 9, the punched out and shaved discs 91, 90 remaining resting on the punch stamps 61, 62, and, as shown in FIG. 10 being ejected by the subsequent actuation of the ejector device 74, 75 over the sheet metal plate 73 and its ramp 730. A brush 751 fixed below the ejector plate 75 serves for cleaning the surfaces of the punches 61 and 62 from splinters and burrs when ejecting the work piece.

Remote-controlled compressed air cylinders fixed to the head plate 2 serve for the actuating of auxiliary abutments 241 (FIG. 12), which are used any time a new sheet metal strip to be punched is inserted, in order to carry out the first two punching operations.

Then the sheet metal strip 9 can be advanced a further pitch, the abutment member 850 engaging into the next hole 90'.

Obviously it is alternatively possible to actuate the locking members for the rigid connection of the two punching tools 5, 6 during the working operations of the device and for the subsequent unlocking, by appropriately controlled hydraulic working members.

With reference to the embodiment illustrated in the FIGS. 14–16 it should be stated, that the punching and shaving operations performed by it correspond entirely to those of the embodiment illustrated in the FIGS. 1–13. The modification consists exclusively in the construction of the locking members, which are designed to connect the punches attached to the base plate with the opposite punches attached to the punch carrier plate, to form a rigid unit after initiating the punching operation, until the punching and shaving operations are terminated.

In FIGS. 14–16 the base plate, denoted 1 in FIGS. 1–13, is denoted 140. Likewise the head plate is denoted 142 instead of 2. Relative to the head plate 142, which is likewise moved up-and-down by means of any suitable press, the carrier plate 144 for the upper punches is movable up-and-down, springs 141 (like the springs 211 of FIGS. 1–13) tending to force the carrier plate 144 against the head plate 142. Exchangeable abutment members 146, which are fixed to the punch carrier plate 144, limit the downward path of the punch carrier plate, in co-operation with uprights 145 fixed to the base plate 140. On the punch carrier plate 144 moreover locking bars 143 are attached in such a manner, that the same extend downwardly from said plate 144.

In the aforesaid uprights cam shafts are journalled, rotatable about horizontal axes, and carry locking cams 150, designed to engage into recesses 147 of the locking bars 143 and thus to interlock the same rigidly with the base plate 140.

On the aforesaid cam shafts control levers 151 and 152, respectively, are fixedly mounted. These two control levers are each connected by a link 153 with a rotatable disc 154, and are moveover connected with one another by a tension spring 155, which tends to turn the control lever 151 in the clockwise sense, and the control lever 152 in the counter-clockwise sense about the axes of the cam shafts 150. This turning is limited on both sides by a stationary abutment pin 156 in co-operation with a recess 157 at the circumference of the disc 154.

When the head plate 142 together with the punch carrier plate 144 is depressed from the starting position of FIG. 14 into the working position of FIG. 15, the recesses 147 in the locking bars 143 reach the level of the cam shafts, so that the cams 150 of the latter can be swung into these recesses by the bias of the tension spring 155 and thus the desired interlocking of the punch carrier plate 144 with the base plate 140 is established. This interlocking remains until on the return stroke of the head plate 142 a declutching lever 160, which is pivotally mounted at 161 on said head plate, is turned, by the action of its laterally projecting nose 162 and of a roller 163 journalled on the punch carrier plate, into the position shown in FIG. 16, and thereby turns both control levers 151 and 152 back into the unlocked position shown in FIG. 14, by means of a roller 158 journalled on the control lever 152. Thereby the interlocking of the cams 150 and locking bars 143 is abolished, and the springs 141 can drive the punch carrier plate 144 back towards the starting position shown in FIG. 14.

While I have herein described and illustrated in the accompanying drawings what may be considered typical and particularly useful embodiments of my said invention, I wish it to be understood, that I do not limit myself to the particular details and dimensions described and illustrated; for obvious modifications will occur to a person skilled in the art.

What I claim as my invention and desire to secure by Letters Patent, is:

1. A device for producing accurate punched sheet metal parts, comprising in combination: a base plate, punches fixed to said base plate, guide pillars rigidly connected with said base plate, a head plate, a punch carrier plate resiliently movable relative to said head plate, both said head plate and punch carrier plate being guided on said pillars, punches fixed on said punch carrier plate opposite said punches fixed on said base plate, exchangeable die plates having dies including between one another a passage slot for the sheet metal, to be punched, a punch on one side of said gap in co-operation with a die on the other side performing a preliminary punching operation, and subsequently a punch on the other side in co-operation with a die on the first mentioned side performing a shaving operation, locking means arranged on said base plate and punch carrier plate rigidly interlocking said base plate and punch carrier plate after the initition of the preliminary punching operation into an integral unit in a position, in which said punches on said base plate and on said punch carrier plate hold said sheet metal immovably fast during all said punching operations until the shaving operation is terminated.

2. A device as claimed in claim 1, wherein said locking means comprise hydraulic jacks operating the same.

3. A device as claimed in claim 1, comprising bolts attached to said head plate, bolt guides connected with said punch carrier plate, return springs arranged on said bolts, and biasing said punch carrier plate towards said head plate, spring washers mounted in said head plate and abutting said punch carrier plate, springs abutting said head plate and said spring washers and overriding said return springs, tending to keep said punch carrier plate at a predetermined distance from said head plate.

4. A device as claimed in claim 3, wherein said locking means comprise pawl levers pivotally attached to said punch carrier plate and pawl holder plates fixed to said base plate, said pawl levers engaging said pawl holder plates after a predetermined downward movement of said punch carrier plate effected by a corresponding downward movement of said head plate, and release members mounted on said head plate and disengaging said pawl levers from said pawl holder plates after the withdrawal of said head plate to its starting position.

5. A device as claimed in claim 4, wherein said bolts are pivotally attached to said head plate and said bolt guides are arranged on said pawl levers on both sides of the pivotal attachments of the latter to said punch carrier plates, said return springs for the punch carrier plates surrounding longer bolts at one side of said pivotal attachments, and the bolts on the other side of said pivotal attachments being shorter and having enlarged heads serving as abutments for disengaging said pawl levers.

6. A device for producing accurate punched sheet metal parts, comprising in combination: a base plate, preliminary punching stamps exchangeably fixed to said base plate, guide pillars rigidly connected with said base plate, a head plate, a punch carrier plate, resiliently movable relative to said head plate and guided on said pillars, shaving punches exchangeably fixed on said punch carrier plate opposite said punches fixed on said base plate, an upper preliminary punching die and a lower shaving die exchangeably attached to said head plate and including between one another a passage gap for the sheet metal strip to be punched, a guide for said sheet metal strip spacing said upper and lower die from one another, a punch on said base plate in co-operation with said upper die performing a preliminary punching operation, and subsequently a punch on said punch carrier plate in co-operation with said lower die performing a shaving operation, locking means arranged on said base plate and punch carrier plate rigidly interlocking said base plate and punch carrier plate after the initiation of the preliminary punching operation into an integral unit in a position, in which said punches on said base plate and punch carrier plate hold said sheet metal immovably fast during all said punching operations until the shaving operation is terminated.

7. A device as claimed in claim 6, wherein said guide of the sheet metal strip has an abutment attached to it.

8. A device as claimed in claim 7, comprising an ejector plate mounted below said shaving die on the level of the end faces of said preliminary punching punches, and an ejector jack operatively connected with said ejector plate and after termination of the shaving operation ejecting the finished punched parts.

9. A device for producing accurate punched sheet metal parts, comprising in combination: a base plate, punches fixed to said base plate, guide pillars rigidly connected with said base plate, a head plate, a punch carrier plate resiliently movable relative to said head plate, both said head plate and punch carrier plate being guided on said pillars, punches fixed on said punch carrier plate opposite said punches fixed on said base plate, exchangeable die plates having dies including between one a passage slot for the sheet metal to be punched, a punch on one side in co-operation with a die on the other side performing a preliminary punching operation, and subsequently a punch on the other side in co-operation with a die on the first mentioned side performing a shaving operation, and locking means comprising cam shafts journalled on said base plate and having cams, and members attached to said punch carrier plate having recesses complementary to said cams, cranks mounted on said cam shafts, a preloaded spring connected to said cranks and biasing said cams towards said recesses, said cams engaging said recesses when the latter have reached their level upon said punch carrier plate being lowered towards said base plate, and disengagement means connected with said head plate and said punch carrier plate disengaging said cams and recesses from one another after the termination of said shaving operation, said locking means interlocking said base plate and punch carrier plate after the initiation of the preliminary punching operation into an integral unit in a position, in which said punches on said base plate and on said punch carrier plate hold said sheet metal immovably fast during all said punching operations.

References Cited by the Examiner

UNITED STATES PATENTS 1,677,151   7/28   Simkins et al. _____ 83—160 X
2,454,143   11/48  England _____ 83—268

WILLIAM W. DYER, Jr., *Primary Examiner.*